United States Patent [19]

Koonen

[11] Patent Number: 4,723,829

[45] Date of Patent: Feb. 9, 1988

[54] OPTICAL WAVELENGTH DEMULTIPLEXER

[75] Inventor: Antonius M. J. Koonen, Hilversum, Netherlands

[73] Assignee: U.S. Philips Corporation, New York, N.Y.

[21] Appl. No.: 758,588

[22] Filed: Jul. 25, 1985

Related U.S. Application Data

[63] Continuation of Ser. No. 433,759, Oct. 12, 1982.

[51] Int. Cl.⁴ .............................................. G02B 6/28
[52] U.S. Cl. .............................. 350/96.19; 350/96.16; 350/96.15; 350/162.23
[58] Field of Search ............... 350/96.15, 96.16, 96.18, 350/96.19, 96.20, 162.23; 372/102, 6

[56] References Cited

U.S. PATENT DOCUMENTS

| | | | |
|---|---|---|---|
| 3,753,148 | 8/1973 | Billman | 372/102 |
| 4,583,820 | 4/1986 | Flamand et al. | 350/96.16 |
| 4,591,237 | 5/1986 | Laude | 350/96.16 |

FOREIGN PATENT DOCUMENTS

| | | | |
|---|---|---|---|
| 0035330 | 3/1980 | Japan | 350/96.19 |
| 0029824 | 3/1980 | Japan | 350/96.19 |
| 0105211 | 8/1980 | Japan | 350/96.19 |
| 0149903 | 11/1980 | Japan | 350/96.18 |
| 56-40804 | 4/1981 | Japan | . |
| 1076393 | 7/1967 | United Kingdom | 350/162.23 |

OTHER PUBLICATIONS

"Viabilities of the Wavelength-Division-Multiplexing Transmission System Over an Optical Fiber Cable" by Miki et al, IEEE Transactions on Communications, vol. COM-26, No. 7 (Jul. 1978).
"Viabilites of the Wavelength-Division-Multiplexing Transmission System Over an Optical Fiber Cable", Miki, IEEE Transactions on Communications, vol. COM-26, No. 7, Jul. 1978.
"Reflection Grating as Elements in Far Infrared Masers", Eric Brannen, Univ. of Western Ontario, London, Canada, Dec. 1965.
Watanabe, R. et al., "Optical Multi/Demultiplexers for Single-Mode Fiber Transmission," *IEEE J. Quantum Elec.*, vol. QE-17, No. 6, pp. 974–1091 (Jun. 1981).
Nosu, K. et al., "A Design on Two-Way Wavelength-Division Multiplexing Transmission For Fiber Optic Subscriber Loops" *Nat'l Telecom. Conf.*, Houston, 1982, vol. 2, pp. 34.1.1–34.1.6.

Primary Examiner—William L. Sikes
Assistant Examiner—Akm E. Ullah
Attorney, Agent, or Firm—Marc D. Schechter

[57] ABSTRACT

A device for separating radiation beams of different wavelengths, which emerge from an optical fiber. The device includes a reflection grating and a wavelength-selective mirror. The wavelength-selective mirror is arranged between the optical fiber and the reflection grating. The mirror reflects radiation beams of wavelengths which are spaced comparatively far from the wavelengths of the radiation beams of comparatively closely spaced wavelengths. The reflected beam is reflected to an output fiber. The mirror transmits the radiation beams of comparatively closely spaced wavelengths to the reflection grating.

5 Claims, 3 Drawing Figures

OPTICAL WAVELENGTH DEMULTIPLEXER

This is a continuation of application Ser. No. 433,759, filed Oct. 12, 1982.

BACKGROUND OF THE INVENTION

The invention relates to a device for separating a radiation beam into its different wavelength components. The beam emerges from an optical fiber, and is separated by a reflection grating.

Such a device is known, for example, from an article by K. Aoyama et al entitled "Low-loss optical demultiplexer for WDM systems in the 0.8-μm wavelength region" (Applied Optics, Vol. 18, No. 16, pages 2834–2836, Aug. 15, 1979). In the known device the radiation beams which emerge from the optical fiber are aimed at the reflection grating by a lens system. The angle at which the radiation beams are reflected by the grating depends on the wavelengths of the beams. After passing through the lens system, the radiation beams thus separated are routed to a plurality of output optical fibers. Each of the output fibers corresponds to a beam of wavelength $\lambda_1, \lambda_2, \ldots \lambda_n$, respectively, which is reflected by the grating at an angle $\alpha_1, \alpha_2, \ldots \alpha_n$, respectively.

It is a disadvantage of the known device that only radiation beams of wavelengths which are comparatively close to each other can be separated.

SUMMARY OF THE INVENTION

It is an object of the invention to provide a device for separating a beam into its component wavelengths which is suitable for one or more radiation beams whose wavelengths differ substantially from those of the other radiation beams. According to one aspect of the invention, a wavelength-selective mirror is arranged between the optical fiber and the reflection grating. The mirror reflects radiation beams of wavelengths which are spaced comparatively far from the wavelengths of other radiation beams (of comparatively closely spaced wavelengths) to an output fiber. The mirror transmits the radiation beams, which are of comparatively closely spaced wavelengths, to the reflection grating.

According to another aspect of the invention, a wavelength-selective mirror is arranged between the optical fiber and the reflection grating. The mirror reflects beams of comparatively closely spaced wavelengths to the reflection grating. The mirror transmits the beams of wavelengths which are spaced comparatively far from those of the beams of comparatively closely spaced wavelengths.

According to a further embodiment of the invention, a reflection grating is arranged both to the path of the radiation beams reflected by the separating mirror and in the path of the beams transmitted by the separating mirror.

DESCRIPTION OF THE PREFERRED EMBODIMENTS

Figure 1:
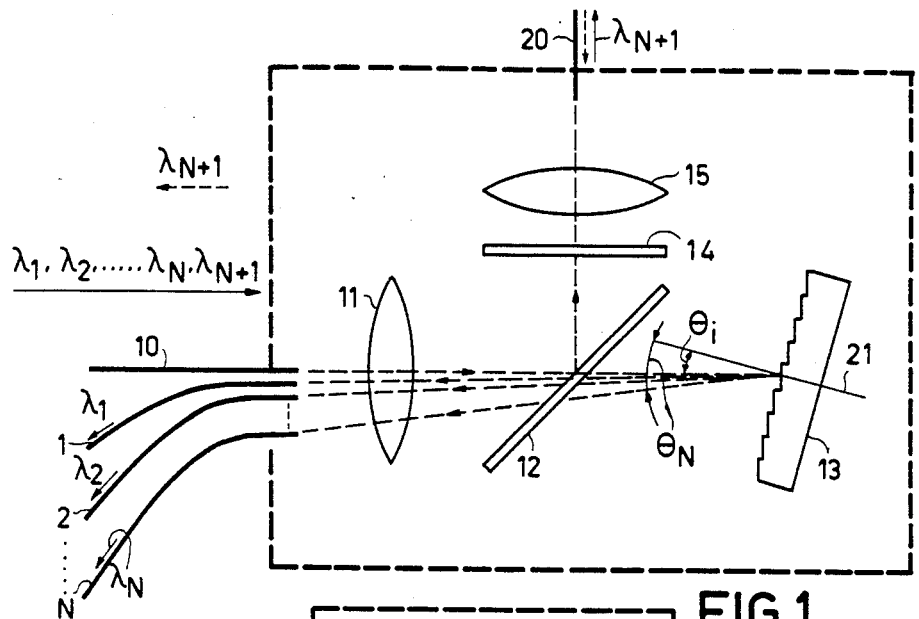
FIG. 1 schematically shows a first embodiment of a device according to the invention.

In the embodiment shown in FIG. 1, beams of wavelengths $\lambda_1, \lambda_2, \ldots \lambda_N, \lambda_{N+1}$ emerge from the input fiber 10 (also referred to as a beam fiber, since it guides the entire beam composed of all wavelength components). The wavelengths $\lambda_1, \lambda_2, \ldots \lambda_N$ (a first wavelength band) of these beams are spaced comparatively close to each other. The wavelength $\lambda_{N+1}$ (a second wavelength band) is spaced comparatively far from the other wavelengths.

Via the lens 11 the beams, which are now parallel, are incident on the wavelength-selective mirror 12. Mirror 12 transmits the beams of wavelengths $\lambda_1, \lambda_2, \ldots \lambda_N$ substantially unimpeded, and it reflects the beam of the wavelength $\lambda_{N+1}$. The dichroic filter 14 transmits this last-mentioned beam to the output fiber 20 via the lens 15. The filter 14 suppresses residual radiation of the wavelengths $\lambda_1, \lambda_2, \ldots \lambda_N$ reflected from the mirror 12.

The beams of the wavelengths $\lambda_1, \lambda_2, \ldots \lambda_N$ are incident on the reflection grating 13 at an angle $\theta_i$ to the normal 21 after being transmitted by the mirror 12. The beam of the wavelength $\lambda_1$ is reflected at an angle $\theta_1$ to the normal 21, that of the wavelength $\lambda_2$ at an angle $\theta_2$, etc. The beams which are thus spatially separated according to their wavelengths are almost fully transmitted by the mirror 12. They are then focussed by the lens 11 at different locations in the focal plane of this lens 11. At these locations the output fibers 1, 2, ... N (also referred to as component fibers, since they each guide a single wavelength component) are arranged. In this way the beams of the wavelengths $\lambda_1, \lambda_2, \ldots \lambda_N$ are separated from each other.

In one embodiment of the invention, the fibers 10 and 20 were identical and had a core diameter of 50 μm. The beams emerging from the fiber 10 had wavelengths of 817 nm, 844 nm and 1325 nm respectively. The beam of a wavelength of 1325 nm entered the fiber 20, that of a wavelength $\lambda_1 = 817$ nm entered the fiber 1, and that of a wavelength $\lambda_2 = 844$ nm entered the fiber 2. The fibers 1 and 2 each had a core diameter of 100 μm. Since the fibers 10 and 20 were identical, it was possible to reverse the direction of the beam having a wavelength of 1325 nm without causing additional losses, i.e. it was possible to couple the beam out of the fiber 20 and into the fiber 10.

Figure 2:
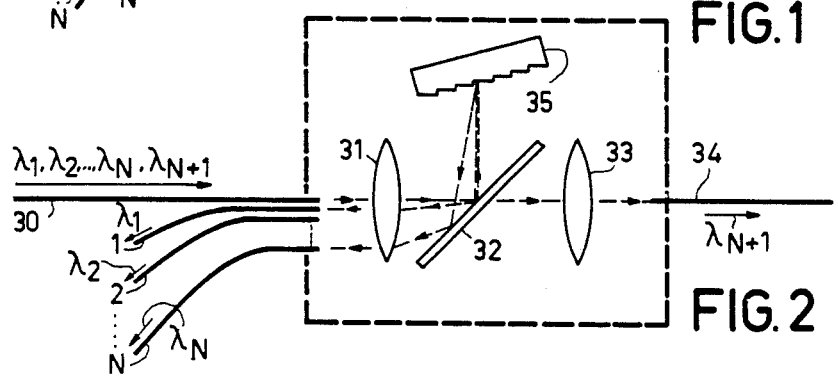
FIG. 2 schematically shows a second embodiment of the invention.

In the embodiment shown in FIG. 2, beams of wavelengths $\lambda_1, \lambda_2, \ldots \lambda_N, \lambda_{N+1}$ emerge from the input fiber 30. The wavelengths $\lambda_1$ to $\lambda_N$ of these beams are comparatively close to each other and the wavelength $\lambda_{N+1}$ differs substantially from the other wavelengths. Via the lens 31 the beams, which are now parallel, are incident on the wavelength-selective mirror 32. Mirror 32 in this embodiment transmits the beam of the wavelength $\lambda_{N+1}$ substantially completely (90 to 95%). Mirror 32 reflects the beams of the wavelengths $\lambda_1$ to $\lambda_N$ almost completely (99.9%).

By means of the lens 33 the transmitted beam is focussed in the focal plane of this lens, where the output fiber 34 is arranged. The reflected beams are incident on the reflection grating 35 and are spatially separated after reflection from the grating. Subsequently these reflected beams are reflected by the mirror 32 and are focussed at the corresponding output fibers 1 to N by means of the lens 31.

The filter 14 used in the embodiment shown in FIG. 1 is eliminated in the embodiment of FIG. 2. Indeed, the component of the beam of wavelength $\lambda_{N+1}$ which has been reflected by the mirror 32 (5 to 10% of the radiation of the wavelength $\lambda_{N+1}$ incident on the mirror 32) is reflected at such an angle by the reflection grating 35, and imaged via the mirror 32 and the lens 31, that the image is situated far beyond the entrance planes of the fibers 1 to N. Thus, even without the filter 14 there will be no crosstalk of radiation having the wavelength $\lambda_{N+1}$ in the fibers 1 to N.

Figure 3:
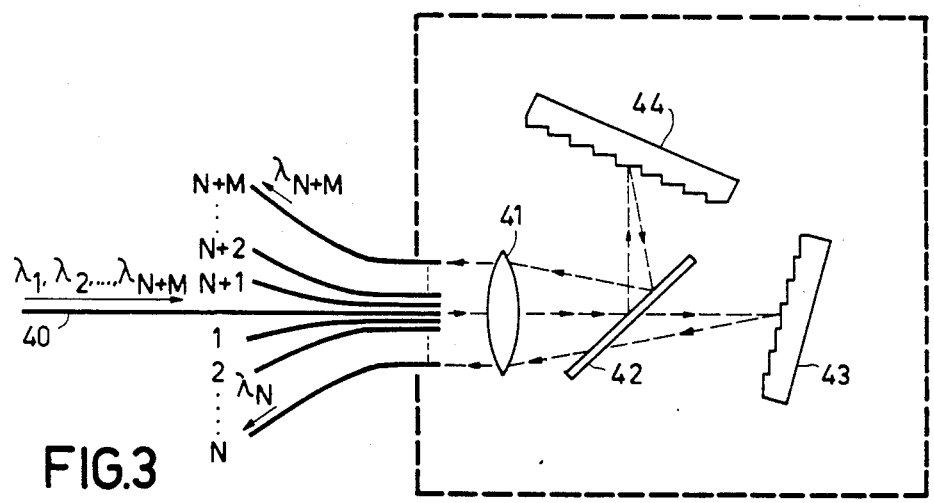
FIG. 3 schematically shows a third embodiment of the invention.

In the embodiment shown in FIG. 3, two reflection gratings are used. The radiation beams have wavelengths $\lambda_1$ to $\lambda_{N+M}$ emerging from the input fiber 40. The wavelengths $\lambda_{N+1}$ to $\lambda_{N+M}$ (the first wavelength band) are situated far from the wavelengths $\lambda_1$ to $\lambda_N$ (the second wavelength band).

Via the lens 41 the beams, which are now parallel, of the wavelengths $\lambda_1$ to $\lambda_{N+M}$ are now incident on the wavelength-selective mirror 42. Mirror 42 transmits the beams of the wavelengths $\lambda_1$ to $\lambda_N$ almost completely (90 to 95%), and it reflects the beams of the wavelengths $\lambda_{N+1}$ to $\lambda_{N+M}$ almost completely (approximately 99.9%).

The transmitted beams are reflected from the reflection grating 43 and are then spatially separated. After passage through the mirror 42 they are focussed by the lens 41 in the entrance planes of the output fibers 1 to N.

The beams of the wavelengths $\lambda_{N+1}$ to $\lambda_{N+M}$ reflected from the wavelength-selective mirror 42 are reflected from the reflection grating 44 and are thus spatially separated. Upon reflection from the mirror 42 a second time, they are focussed in the entrance planes of the output fibers N+1 to N+M by means of the lens 41. It is evident that, in the same way as in the embodiment shown in FIG. 2, the filter 14 of FIG. 1 may also be dispensed with in the embodiment shown in FIG. 3.

What is claimed is:

1. A device for separating a radiation beam into its component wavelengths, said beam comprising radiation in a first wavelength band and radiation in a second wavelength band spaced from the first wavelength band, each band containing at least one wavelength component, said device comprising:

a beam optical fiber for guiding the entire radiation beam of the combined wavelength components;

at least two first component optical fibers arranged adjacent to the beam optical fiber, each first component optical fiber arranged to guide a different selected wavelength component of the radiation beam;

a second component optical fiber arranged away from the beam optical fiber, said second component optical fiber arranged to guide another selected wavelength component of the radiation beam;

a wavelength-selective reflector arranged to receive radiation from the beam optical fiber and direct radiation to the component optical fibers, said reflector transmitting radiation in the first wavelength band and reflecting radiation in the second wavelength band; and a reflective diffraction grating arranged to receive radiation from one wavelength band from the wavelength-selective reflector, said diffraction grating separating the band into its component wavelengths and arranged to reflect the separated component wavelengths back to the wavelength-selective reflector.

2. A device as claimed in claim 1, characterized in that:

the first wavelength band consists essentially of a single wavelength component;

the second component optical fiber is arranged to receive the single wavelength component transmitted through the reflector; and the grating is arranged to receive radiation from the second band which is reflected by the reflector.

3. A device as claimed in claim 1, characterized in that:

the second wavelength band consists essentially of a single wavelength component;

the second component optical fiber is arranged to receive the single wavelength component reflected by the reflector; and the grating is arranged to receive radiation from the first band which is transmitted through the reflector.

4. A device as claimed in claim 1, further comprising a lens arranged between the wavelength-selective reflector and the second component optical fiber.

5. A device as claimed in claim 1, further comprising a wavelength-selective filter arranged between the wavelength-selective reflector and the second component optical fiber.

* * * * *